Figure 1:
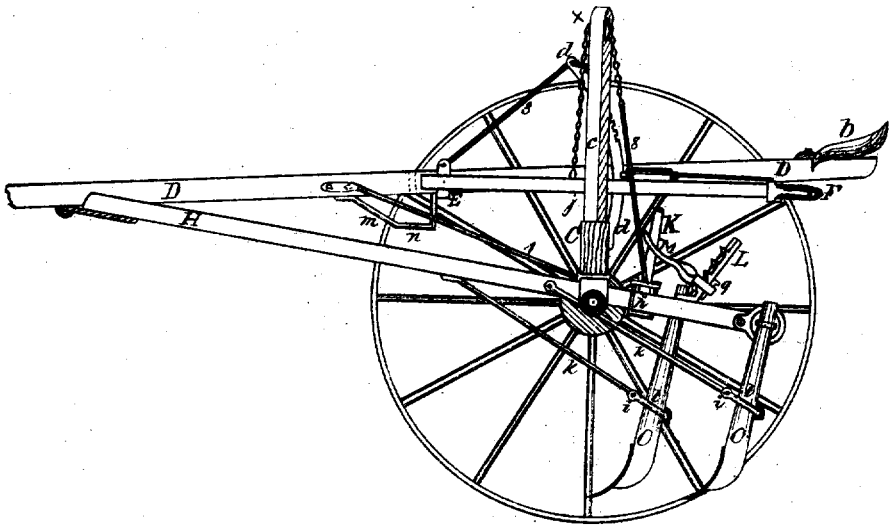

Bertrand & Sames, 2. Sheets, Sheet. 1.

Wheel Cultivator.

No. 4,309. Reissued Mar. 28 1871

Witnesses

Jacob Bekel.
Geo. S. Harlow.

Inventors

Theophilus P. Bertrand
Peter Sames

N. PETERS, PHOTO-LITHOGRAPHER, WASHINGTON, D. C.

Bertrand & Sames, 2. Sheets, Sheet 2.

Wheel Cultivator.

No. 4,309. Reissued Mar. 28. 1871.

Witnesses.
Jacob Bekel.
Geo. S. Haskell.

Inventors.
Theophilus F. Bertrand
Peter Sames

N. PETERS, PHOTO-LITHOGRAPHER, WASHINGTON, D. C.

United States Patent Office.

THEOPHILUS F. BERTRAND AND PETER SAMES, OF ROCKFORD, ILLINOIS.

Letters Patent No. 60,916, dated January 1, 1867; reissue No. 4,309, dated March 28, 1871.

IMPROVEMENT IN CULTIVATORS.

The Schedule referred to in these Letters Patent and making part of the same.

We, THEOPHILUS F. BERTRAND and PETER SAMES, both of Rockford, in the county of Winnebago, in the State of Illinois, have invented certain Improvements in Cultivators, of which the following is a specification.

The object of this invention is to simplify and at the same time make the cultivator susceptible of easy adjustment to different crops and the varying modes of cultivation as practiced by different persons upon different soils and the different sizes of plants that are being cultivated; and Our invention consists in the special construction, arrangement, and combination of the parts that compose the machine, so that a greater number of changes and adjustments may be made with a fewer number of parts, and fully accomplish the object sought, than by any other machine within our knowledge.

In the drawing—

Figure 2:
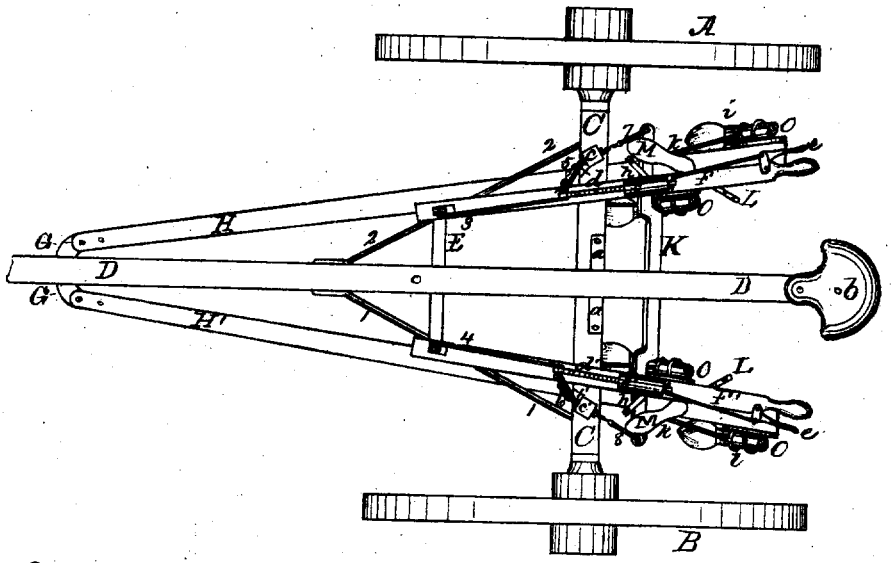
Figure 3:
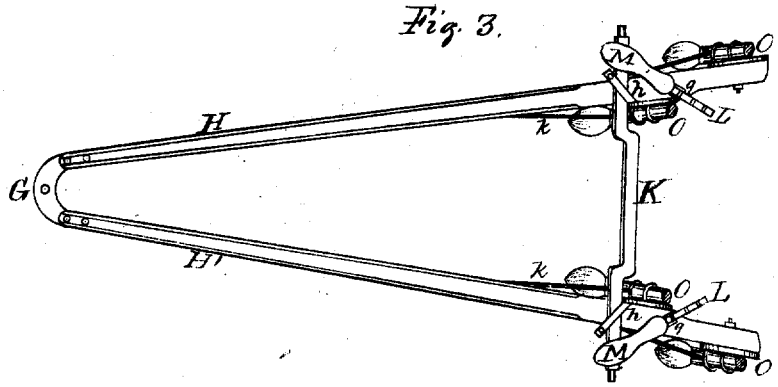
Figure 5:
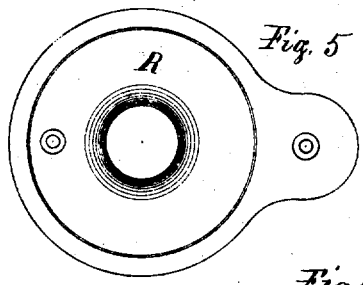
Figure 4:
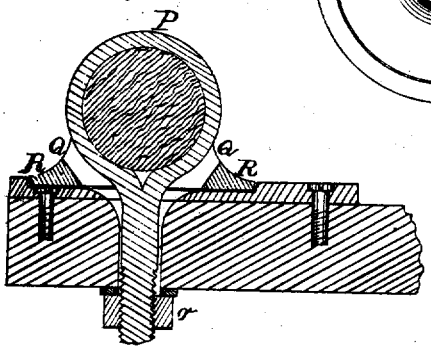

Figure 1 represents a side elevation of our cultivator;

Figure 2, a plan view of the same;

Figure 3, a plan view of the auxiliary frame and what is attached thereto;

Figure 4, a section through the eye-bolt and socket-plate and bed-plate;

Figure 5, a plan view of the bed-plate; and

Figure 6:
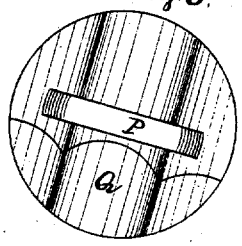

Figure 6, a plan view of the socket-plate.

A and B represent the two wheels which receive and revolve on the arms of the bent axle C.

D is the tongue of the cultivator, and is rigidly secured upon axle C by means of the raised bracket *a*, and is stayed in its place by brace-rods 1 and 2, these parts forming the main supporting frame of the cultivator.

Tongue D extends back of the axle C far enough to receive and support on its rear end the driver's seat *b*, and may consist of one or more pieces, and be flexible or rigid, as desired.

Forward of the axle C, and on either the upper or under side of the tongue D, is firmly attached the cross-piece E, the ends of which furnish fulcrum-supports for levers F and F′ and abutments for rods 3 and 4.

Upon axle C, and equidistant from the center thereof, are secured the vertical, or nearly vertical, standards *c* and *c*′, near the top ends of which are friction-pulleys *x x*′.

*d* and *d*′ are curved notched bars, fastened to the rear side of axle C, and near to the standards *c* and *c*′. These notched bars extend upward from the axle and pass through levers F and F′, and their curvature agrees with the segment of a circle, formed by the radius, having the same length as that on the levers from the point at which they are pivoted to cross-piece E and the point where they pass upward through said levers, and they are stayed at their upper ends to standards *c* and *c*′ by bolts 5 and 6, and forward to the cross-piece E by stay-rods 3 and 4.

F and F′ are two levers, pivoted at their forward ends to cross-piece E, and have a mortise made vertically through them to receive rack-bars *d* and *d*′, so as to be free to rise or fall, as may be desired, and be controlled in such vertical movement by spring-bolts, the ends of which are so arranged as that they are forced by the spring to engage in the notches of the rack-bars *d* and *d*′ when they are held firmly in their place, and will remain until the bolt is withdrawn from the notches in the curved rack-bars by means of the pivoted hand-lever *e*, connected to a draw-rod, and so constructed as to operate the spring-bolt that engages in the notches in the curved rack-bars *d* and *d*′, when the levers are free to rise or fall.

*f* and *f*′ are caps on levers F and F′ for covering and protecting the springs on the spring-bolts from becoming filled with dirt or dust, and thereby be inoperative.

H and H′ are two beams, each carrying one or more plows, and are either pivoted or rigidly secured to a yoke, G, at their forward ends, and rigidly connected toward their rear ends by an arched connecting-bar K, secured thereto by means of screw staple-clamps *h* or other equivalent devices.

Thus the beams H and H′ can be, at their rear ends, adjusted to any desired width by simply loosening the clamp-staples *h* and sliding said beams on arched connecting-bar K and tightening the clamp-staples *h* again. These parts constitute the auxiliary frame.

The forward ends of beams H and H′ are separated by means of yoke G for the purpose of admitting the more advanced crops or plants to enter and pass between them without injury.

For the purpose of preventing any rocking tendency in the auxiliary frame, bearings, projecting outside of beams H and H′, are provided to receive the pendent ends of rods or chains 7 and 8. In this instance the projecting ends of arched connecting-bar K furnish the bearings.

The auxiliary frame is connected with the tongue of the rigid frame by a staple, pivot-bolt, or other device, forward of the evener or whiffle-trees, and extends rearward, and vibrates underneath the axle or rods or chains 7 and 8, which are secured to the projecting ends of arched connecting-bar K, from whence they are passed over pulleys *x* and *x*′, in standards *c* and *c*′, and are connected to levers F and F′ by eye-bolts *j*, so that, when the levers F and F′ are depressed, the plows will be raised out of the ground, the axle C supporting the rear portions of the auxiliary frame and the tongue the forward end; but when the levers are raised the frame and plows with it are lowered to any depth desired.

In the cultivation of crops in rows, the rows are not always straight, or the plants may not have come up in straight lines; hence it is desirable to so construct the auxiliary frame as that its rear end may vibrate laterally, and thereby enable the frame to carry the plows clear of the plants that may be out of line; and in order to cause the auxiliary frame and plows to come under the control of the driver in this respect, adjustable foot-rests M are made to be adjusted at the proper height on standards L, which have teeth or projections on one side, and are rigidly secured to the auxiliary frame in such relation to the driver's seat as would be most convenient in operating the frame and plows to preserve the proper distance from the plants.

The foot-rest has an opening in it of the proper shape to pass over the toothed-bar L, and when in its place, and at the proper height, it is held by the force of gravity alone; but in consequence of the rapid movement of the cultivator over rough places the foot-rest M is subjected to such kind of sudden jars as will cause it to become loose and may be thrown out of its position, and to avoid such casualties we provide a wedge, 9, that, when placed in the opening in the foot-rest opposite the teeth on the standard, will effectually prevent their existence.

P is a screw eye-bolt, having a shank, *p*, that passes through a fluted circular socket-plate, Q, and bed-plate R.

Q is a circular socket-plate or block, fluted to receive the shovel-standard O, and through which the shank *p* of eye-bolt P passes.

R is a bed-plate with recessed bearing, to receive the plate or block Q, and is secured, by screw-bolt or other means, to the beams H H′ in proper places to receive the eye-bolts P.

Eye-bolts P receive the standards or stocks O of the plows by passing the upper end of the standards through the eye of the eye-bolts P.

O O are the plow-standards or stocks, and have the plows securely attached to their lower ends.

*l* is a ring that encircles each of the standards or stocks O above the shovels, the fronts of which are fitted to receive the rear ends of the brace-rods *k*, to which they are connected by a safety-pin, *i*, and the forward ends of brace-rods *k* are fast to beams H and H′, as seen in figs. 1 and 2.

*i i* are safety-pins, made of wood, and strong enough to hold the plow in ordinary work without breaking; but when a plow strikes a rigid obstacle, the pin *i* will break, and leave that plow with the standard or stock free to turn back unhurt, when it can be turned back again and a new wooden pin inserted, and the cultivator is ready for work again.

By this construction and arrangement of parts the standards or stock O, with the plow attached, can be turned to any angle desired in either direction, and so that the plow will throw the loose ground that they raise either to or from the plants in the rows which are being cultivated; the plow can be adjusted to any desired depth in the ground, or be raised up and held above and out of contact with the ground; will permit a plow or any of the plows to encounter a rigid obstruction without injury to the cultivator, only requiring the insertion of a new wooden pin; and at the same time allows of an easy but limited side movement of the auxiliary frame and plows by the force exerted by the driver through his feet upon the foot-rests or supports to so control their direction as to safely cultivate such plants as have been irregularly planted or that may not have come up in straight lines, and makes our cultivator effectively perform a variety of kinds of work; is of light draft and easy for the driver; is not expensive or easily put out of repair or broken.

At the will of the driver the auxiliary frame, with the plows, can be swung to the right or left by the application of such force as he can control and exert to effect such result, whereby the plows are made to swing aside from their direct line of draft, and avoid coming in contact with such plants as may be out of a straight line in the rows.

What we claim as our invention, and desire to secure by Letters Patent, is—

1. The combination, substantially as described, of the tongue D with the axle C, arranged in the manner and for the purpose described.

2. The cross-piece E, attached to the tongue D, substantially in the manner and for the purpose described and shown.

3. The standards *c* and *c′*, having pulleys *x* and *x′*, when arranged upon and attached to the axle C, in combination with the chains and rods 7 and 8 and the hinged inclined auxiliary frame H and H′, arranged to operate substantially as shown and described.

4. The curved notched bars *d d′*, secured at their upper ends to the standards *c* and *c′* by rods 5 and 6, and to the cross-piece E by rods 3 and 4, in the manner and for the purpose set forth.

5. The combination of two supporting-levers F and F′ with their spring-bolts and curved notched bars *d* and *d′*, with the hinged inclined auxiliary frame H and H′, when constructed and arranged to operate in the manner shown.

6. The adjustable foot-rest M, notched standards L, and holding-wedge 9, when constructed and arranged to operate together in the manner and for the purpose described.

7. Adjusting the auxiliary frame H and H′, with the plow-standards, to different widths by means of the arched coupling-bar K and screw staple-clamps *h*, as described and shown.

8. The screw eye-bolts P and socket-plate or block Q, in combination with bed-plate R, constructed and arranged to operate as shown.

9. The standard O, screw eye-bolt P, socket-plate or block Q, and bed-plate R, in combination with beams H and H′, substantially as shown and described.

10. The safety-pin *i*, in combination with the standards O, screw eye-bolt P, rings *l*, brace-rod *k*, and auxiliary frame H and H′, in the manner and for the purpose described.

11. The combination of the rigid frame, consisting of the tongue D and axle C, the hinged auxiliary frame H and H′, carrying the plows, and their means of adjusting the same laterally, consisting of the arched bar *k* and screw-staples *h*, with the foot-supports M M and the lifting and holding devices supported upon the tongue and axle, in the manner and for the purpose shown and described.

THEOPHILUS F. BERTRAND.
PETER SAMES.

Witnesses:
GEO. S. HASKELL,
JOHN HOLLISTER.